(12) United States Patent
Becherucci et al.

(10) Patent No.: US 6,532,645 B1
(45) Date of Patent: Mar. 18, 2003

(54) WIRE WINDING APPARATUS FOR DYNAMO-ELECTRIC COMPONENTS

(75) Inventors: Raffaele Becherucci, Florence (IT); Gianfranco Stratico, Siena (IT)

(73) Assignee: Axis USA, Inc., Tampa, FL (US)

( * ) Notice: Subject to any disclaimer, the term of this patent is extended or adjusted under 35 U.S.C. 154(b) by 14 days.

(21) Appl. No.: 09/697,675

(22) Filed: Oct. 26, 2000

Related U.S. Application Data
(60) Provisional application No. 60/203,756, filed on May 12, 2000, provisional application No. 60/186,963, filed on Mar. 6, 2000, and provisional application No. 60/163,363, filed on Nov. 3, 1999.

(51) Int. Cl.[7] ............................................. H02K 15/04
(52) U.S. Cl. ..................... 29/596; 242/361.1
(58) Field of Search ................... 29/596, 597, 598, 29/605; 242/361.1, 363, 362.1

(56) References Cited

U.S. PATENT DOCUMENTS

| | | | |
|---|---|---|---|
| 4,279,944 A | * 7/1981 | Laskaris | 427/62 |
| 4,350,914 A | * 9/1982 | Searle | 310/194 |
| 4,416,058 A | * 11/1983 | Henry, Sr. et al. | 29/734 |
| 5,592,731 A | * 1/1997 | Huang et al. | 29/596 |
| 5,986,377 A |  11/1999 | Yamada et al. | 310/216 |
| 6,219,900 B1 | * 4/2001 | Suzuki | 29/598 |

FOREIGN PATENT DOCUMENTS

| | | | |
|---|---|---|---|
| EP | 0 652 622 A2 | 5/1995 | ............ H02K/1/14 |
| JP | 07194075 | 7/1995 | |
| JP | 7245895 | 9/1995 | |
| JP | 8033292 | 2/1996 | |
| JP | 9163690 | 6/1997 | |
| JP | 10271770 | 10/1998 | |
| JP | 11018331 | 1/1999 | |
| JP | 11178290 | 7/1999 | |
| JP | 11187630 | 7/1999 | |

* cited by examiner

Primary Examiner—Gregory M. Vidovich
Assistant Examiner—Stephen Kenny
(74) Attorney, Agent, or Firm—Fish & Neave; G. Victor Treyz; James A. Leiz

(57) ABSTRACT

Methods and apparatus are provided for wire winding and fabrication for dynamo-electric machine components such as ferromagnetic armature or stator cores for motors or the like. Wire may be wound onto individual portions of dynamo-electric machine components, which may then be assembled to form complete components. Wire may be wound by steering a rotating flyer or the like in a trajectory that closely follows the surface of the core onto which the wire is being wound. Wire may also be wound by rotating the portions during winding. The same holding members that are used to hold the portions during winding may be used to hold the portions during assembly of the portions into machine components.

24 Claims, 13 Drawing Sheets

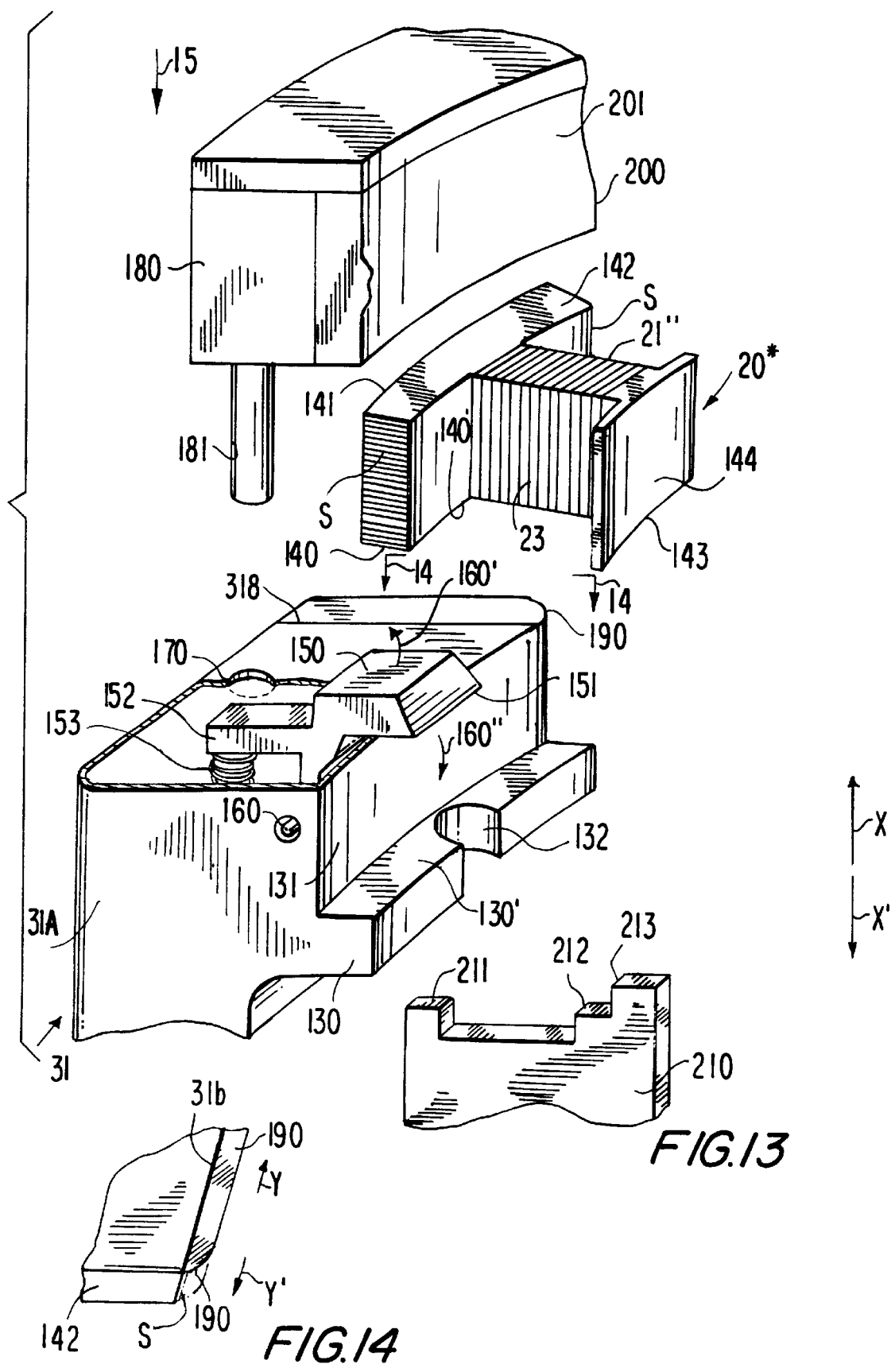

WIRE WINDING APPARATUS FOR DYNAMO-ELECTRIC COMPONENTS

This application claims the benefit of United States provisional application Nos. 60/163,363, filed Nov. 3, 1999, 60/186,963, filed Mar. 6, 2000, and 60/203,756, filed May 12, 2000, which are hereby incorporated by reference herein in their entireties.

BACKGROUND OF THE INVENTION

The present application concerns winding wire coils for a ferromagnetic core of a stator or of an armature for a dynamo-electric machine such as an electric motor, a generator, an alternator, or the like.

Wire winding machines are used to wind wire onto the ferromagnetic cores of dynamo-electric machine parts such as armatures and stators. The cores have slots into which wire must be wound to form wire coils. In operation of these parts, current is passed through the coils.

To form the coils, wire is dispensed from a rotating arm called a flyer. The flyer rotates about the core repeatedly, depositing wire turns to form complete coils.

In electro-dynamic machine components such as armature cores and stator cores, the slots into which the wire is wound should be relatively small for optimal motor performance. However, slots that are too small may unduly limit the number of wire turns that may be placed onto the core.

Moreover, it would be desirable to be able to control the wire that is wound onto such dynamo-electric machine components by limiting the length of the free wire between the flyer and the part being wound as much as possible.

It is therefore an object of the present invention to provide improved arrangements for winding wire onto dynamo-electric machine components and for forming such components.

SUMMARY OF THE INVENTION

This and other objects of the invention are accomplished in accordance with the principles of the present invention by providing wire winding arrangements in which wire may be wound onto the pole pieces of armatures or stators or other dynamo-electric machine components. Wire may be wound onto individual pole pieces that are assembled into a complete dynamo-electric machine component after winding. For example, a machine may be provided that grips individual separate portions of a dynamo-electric machine component during winding. When each such portion has been wound, the portions may be turned to face each other and may be gathered together to form a final component. More wire may be wound onto such dynamo-electric machine component portions than could generally be wound onto prefabricated dynamo-electric machine components. If desired, an insulating holster may be used to facilitate the assembly of the portions being wound.

A wire winding arrangement may be provided in which wire is dispensed from a wire winding nozzle or other wire dispensing structure that follows a winding trajectory that parallels the surface of the piece being wound. The piece being wound may have, for example, a non-circular or nearly elliptical cross-section. The wire winding nozzle may be moved along a path that closely follows the surface of such a piece during winding, thereby minimizing the distance between the nozzle exit and the piece and increasing the control of the winding apparatus over the wire winding process.

Further features of the invention, its nature and various advantages will be more apparent from the accompanying drawings and the following detailed description of the preferred embodiments.

BRIEF DESCRIPTION OF THE DRAWINGS

FIG. 13 is a perspective view of an illustrative winding machine arrangement for winding portions of dynamo-electric machine components in accordance with the present invention.

FIG. 14 is a detailed view taken from direction 14 of FIG. 13 showing how pliers may grip the portion being wound in accordance with the present invention.

DETAILED DESCRIPTION OF THE PREFERRED EMBODIMENTS

The present invention concerns solutions for winding coils. As an illustrative example, coils may be wound around the poles of cores used in brushless motors.

Figure 1:
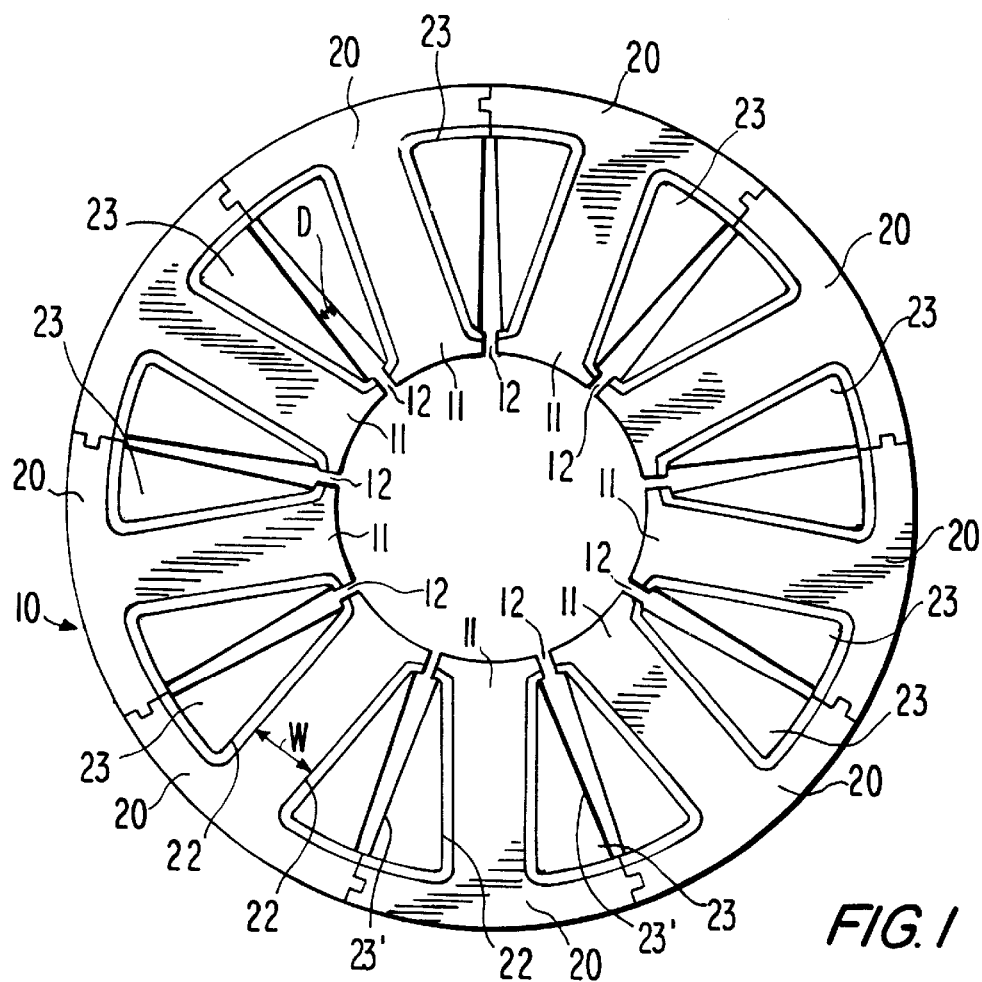
FIG. 1 is an end view of an illustrative dynamo-electric machine component that may be formed in accordance with the present invention.

A core which can be wound in accordance with the principles of the invention is shown in FIG. 1.

FIG. 1 is an end view of the core (reference numeral 10), formed from laminations stacked into the page containing the view of FIG. 1. The core is notable in that the poles 11 are formed from independent lamination portions 20, like the one shown in FIG. 2 (which is still an end view like shown in FIG. 1).

Portion 20 is formed of laminations 21 (stacked into the page containing the view of FIG. 2), insulation lining 22, and coil 23. Coil 23 is formed from a predetermined number of wire turns W. In many of the FIGS. of this disclosure, the wire turns W have been omitted for sake of clarity. The most external space occupied by the coils is sometimes shown by means of confining lines 23'.

Ends 21' and 21" of laminations 21 are provided with protuberance 21a and recess 21b, respectively, on opposite sides of central neck 21'''.

As shown in FIG. 1, the entire core 10 can be formed by causing protuberances 21a to be inserted in recesses 21b, thereby joining together the required number of portions 20. Coils 23 can only be wound before joining together the separate portions 20. This is due to the very small distance D existing between adjacent coils in the core and also because of the lack of sufficient aperture of openings 12, which are formed between the tips of the central necks. This arrangement does not provide sufficient room for the passage of wire or needles (to deliver the wire) during winding.

Figure 2:
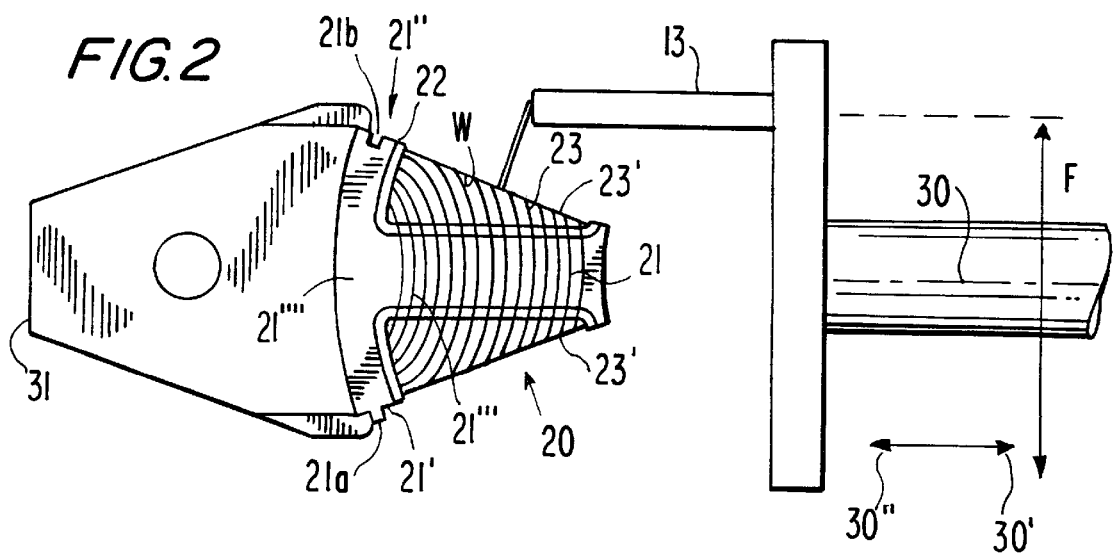
FIG. 2 shows how an individual portion of the dynamo-electric machine component may be wound in accordance with the present invention.

A coil 23 can be wound by presenting portion 20 to a flyer arm 13 which is able to rotate around axis 30 to deliver the turns around the central neck 21'''. Portion 20 or the flyer arm can be moved in directions 30' and 30", parallel to axis 30, in order to favor distribution of the turns along the central neck and to obtain the trapezoidal form of the coils shown by confining lines 23'. In FIG. 2, portion 20 is held by holding members such as pliers 31, to correctly position portion 20 with respect to the flyer arm.

Figure 3:
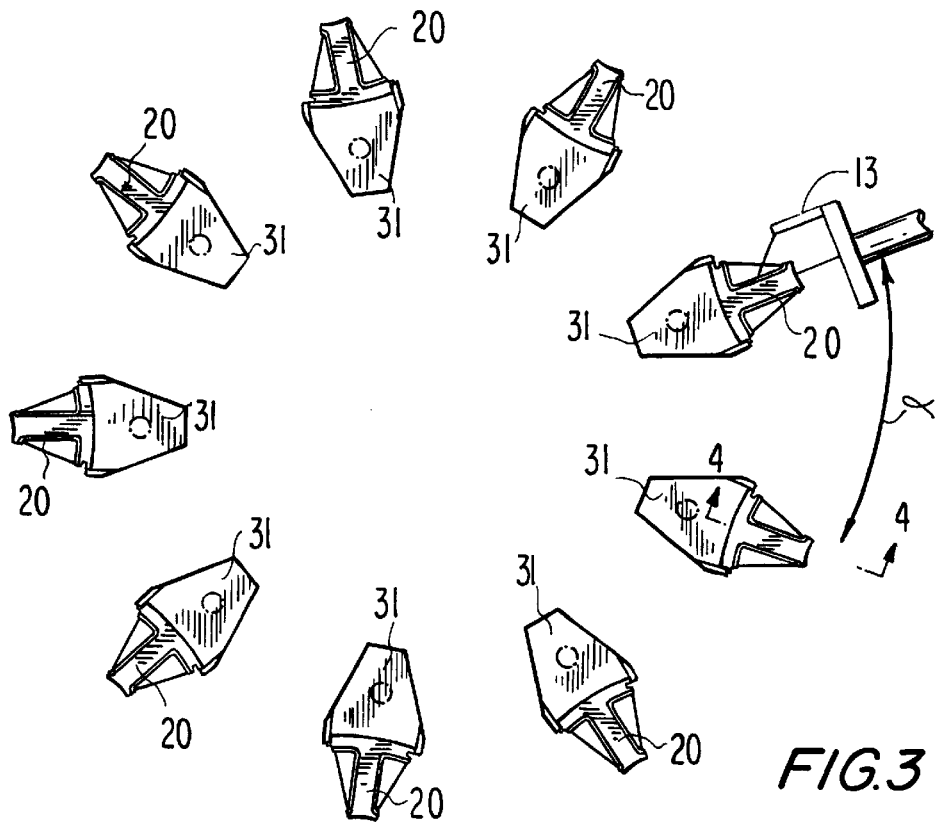
FIG. 3 shows how each of the various portions that are used to form the component of FIG. 1 may be wound when positioned in a circular arrangement in accordance with the present invention.
Figure 4:
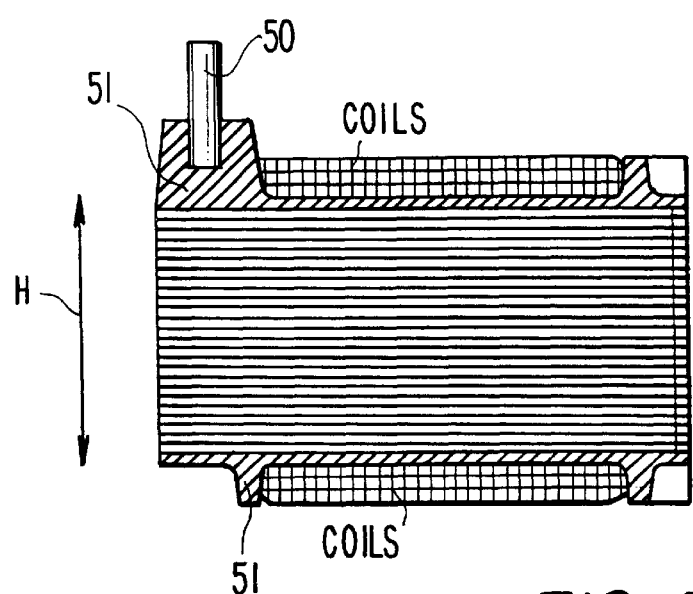
FIG. 4 is a cross-sectional view of an illustrative portion of a dynamo-electric machine component wound in accordance with the present invention.

FIG. 3 illustrates how the various portions that are required to form the core can be wound and prepared for joining together. The portions are held by respective pliers like 31 on an imaginary circle which can be larger than the diameter of the core. The pliers may be mounted on positioning arms or members. The central necks 21''' of the portions are directed outwardly, as shown in FIG. 3. With the portions positioned in this manner, it is possible to wind them with respective flyer arms, as is shown for one portion in FIGS. 2 and 3. More particularly, the diameter of the imaginary circle where the portions are held can be large enough to have an angular distance alpha between the portions. This will allow a plurality of flyers arms to be rotating to wind all the portions at the same time, with each flyer arm 13 winding a respective portion. Only one flyer arm 13 has been shown in FIG. 3 for sake of clarity. The diameter F (FIG. 2) of each flyer rotation needs to take into account not only the width W (FIG. 1) of the neck portions, but also their projection into the page (i.e. the height H of the neck portions, as shown in FIG. 4. The greatest of these two sizes W and H will dictate the diameter of the flyer rotations.

Any wire leads belonging to the coils can be terminated by wire manipulators to respective terminal posts 50 located on the end insulation boards 51 of the portions, as shown in the view of FIG. 4, which is seen from directions 4—4 of FIG. 3.

Figure 5:
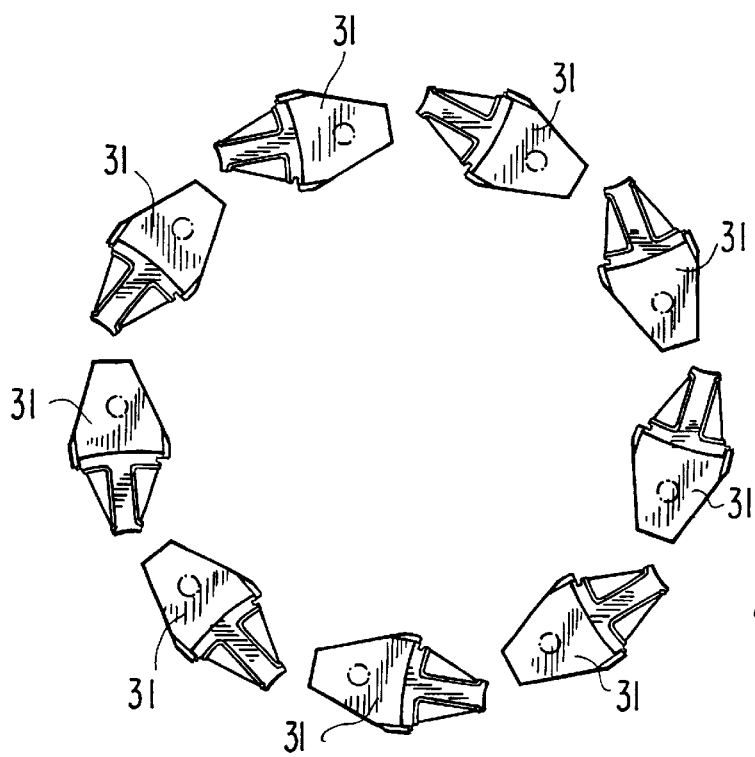
FIG. 5 shows how the portions of the dynamo-electric machine component of FIG. 3 may be rotated to face each other in accordance with the present invention.
Figure 6:
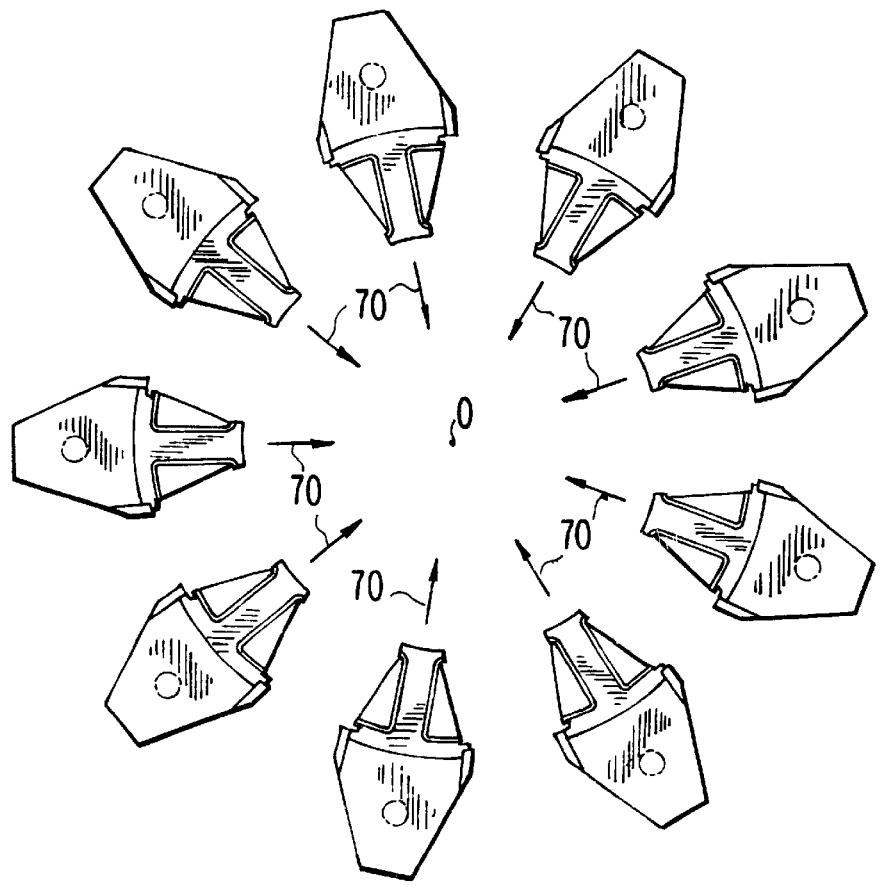
FIGS. 6 and 7 show how the portions of the dynamo-electric machine component of FIG. 5 may be moved to converge towards each other to gather the portions together to form the dynamo-electric machine component in accordance with the present invention.

FIG. 5 is a view similar to that of FIG. 3, showing what happens to the portions after winding and termination has been completed. As shown in FIG. 5, each plier 31 is turned on the imaginary circle to direct the central necks towards center 0 of the imaginary circle. FIG. 6 shows the conditions of the central necks at the end of the turning operation being accomplished in FIG. 5. Once the condition of FIG. 6 has been achieved, pliers 31 can be moved inwardly in directions 70, each on a radius of the imaginary circle. The movement of the pliers should be such that the pliers are always on the same circumference, which becomes smaller and smaller, and is always centered on center point 0. Towards the end of this movement, protuberances 21a will be inserted in recesses 21b to join the portions together (see FIG. 7). The movement towards center 0 can continue further to fully insert the protuberances in the recesses. A forced fit between the protuberances and the recesses can be sufficient to keep the portions together in the final core configuration shown in FIG. 1.

Figure 7:
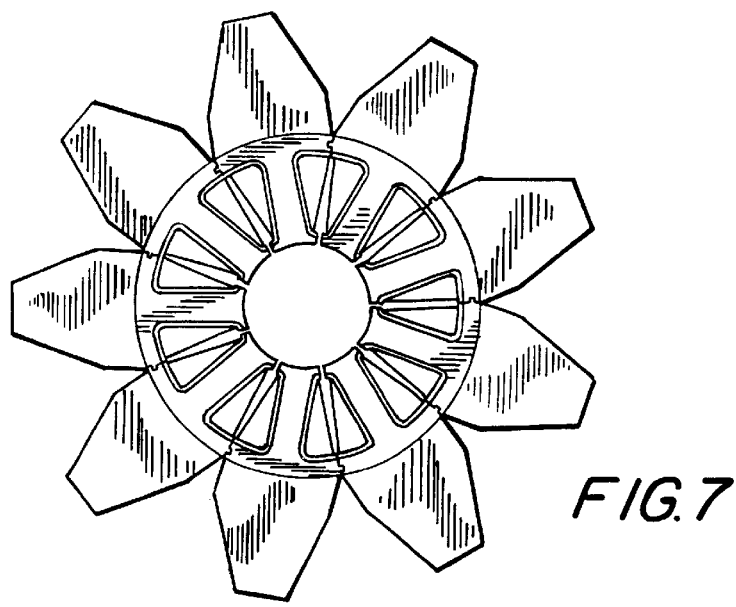
Figure 8:
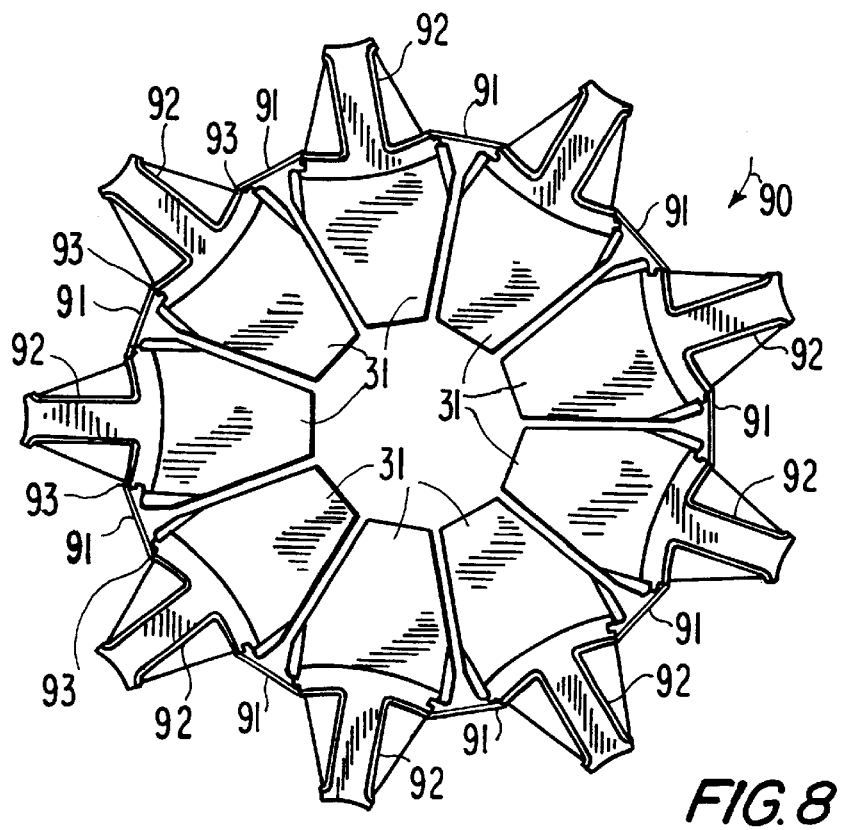
FIG. 8 shows an illustrative insulating holster arrangement that may be used in accordance with the present invention.

FIG. 8, which is a view similar to the views shown in FIGS. 3, 5, 6 and 7, shows a different arrangement for winding and joining separate portions 20. In FIG. 8, the individual separate portions have been inserted into a holster 90. The holster has pockets 92, which are the insulation linings needed to insulate portions 20. Each pocket 92 forms the lining 22 for a portion 20, and is connected to an adjacent portion by means of arm 91. In this way, the holster is one piece formed of angularly spaced pockets 92 connected by means of arms 91.

Portions 20 can be inserted into the pockets 92, by aligning the portions 20 over the pockets 92. Portions 20 can then be slid into the pockets (e.g. with a movement in a direction that is perpendicular to the page containing FIG. 8).

The holster can be closed on the end opposite to the one shown in FIG. 8 (the end shown in FIG. 8 is open for insertion of the portions), with branches that cover the central neck portions and curved head portions 21''''. These branches will act as insulating end boards for the portions 20 (like end insulation boards 51 shown in FIG. 4), around which the coils will be wound.

Once the portions have been inserted in the pockets, a cap formed of branches similar to those forming the closure on the opposite side, can be placed over the end of the portions shown in FIG. 8. The area of the branches that covers curved heads 21'''' (FIG. 2) can be provided with terminal pockets for termination of the coils.

The use of holster 90 is advantageous when preparing the portions for gripping by pliers like pliers 31. Inserting the portions in the holster and attaching the cap is essentially the entire insulating operation for the portions. Once this has been done, the portions are ready to be gripped by pliers like pliers 31. If desired, the holster with the portions already inserted can easily be made to encircle pliers like pliers 31, as shown in FIG. 8. Once encircled, all the pliers can be caused to simultaneously grip their respective portions.

Further, the preparations of the portions in holster 90 can take place in an operating unit that is separate from the unit where winding and termination are carried out. A transport pallet can be used to carry the holster between the two units.

Once pliers 31 have gripped the portions, as shown in FIG. 8, winding of all of the coils 23 can take place simultaneously by applying a plurality of flyer arms, in number equal to the number of portions, each applied to a respective portion, with all of them rotating at the same time. If desired, a smaller number of flyer arms rotating at the same time may be used to wind respective portions. With this type of arrangement, the pliers may be used to provide successive groups of unwound portions to the flyer arms (e.g., by rotating about center 0).

Figure 9:
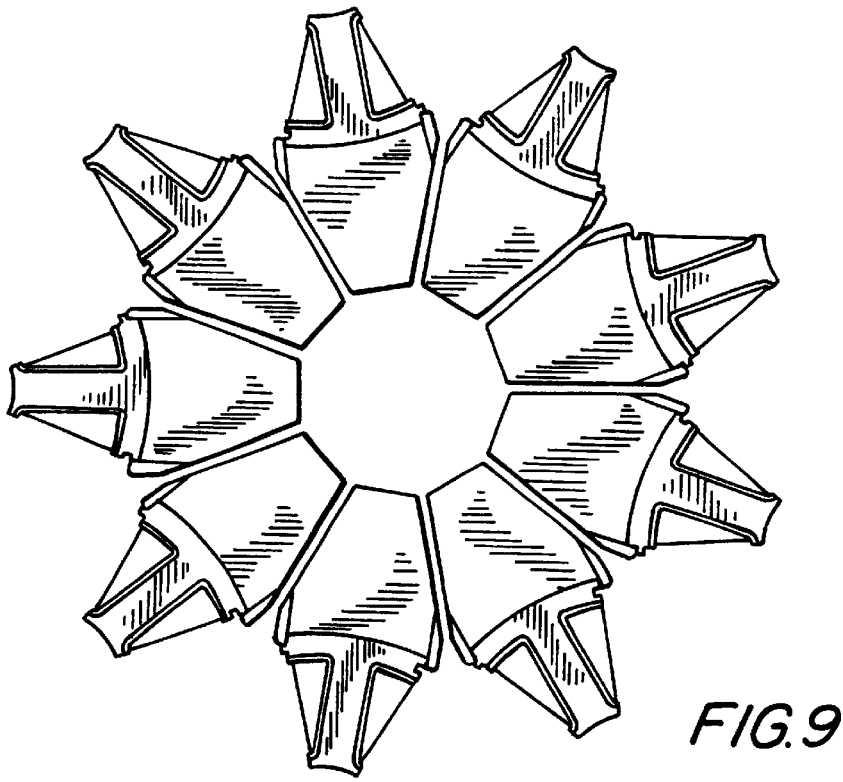
FIG. 9 shows the holster arrangement of FIG. 8 after a shearing operation has been performed in accordance with the present invention.

If the angular distance alpha between the portions does not allow sufficient room for the flyer arm rotations required for winding of the coils, then arms 91 can be cut at edges 93 to remove the arms that connect the pockets. This can be performed using a shearing operation that has a direction of movement perpendicular to the page containing FIG. 8 and that is applied at points 93. The condition of the holster after shearing is shown in FIG. 9. Without the connection between the pockets, pliers 31 can be moved according to the sequence of operations shown in FIGS. 3, 5, 6, and 7 to facilitate the winding and joining of portions 20.

Figure 10:
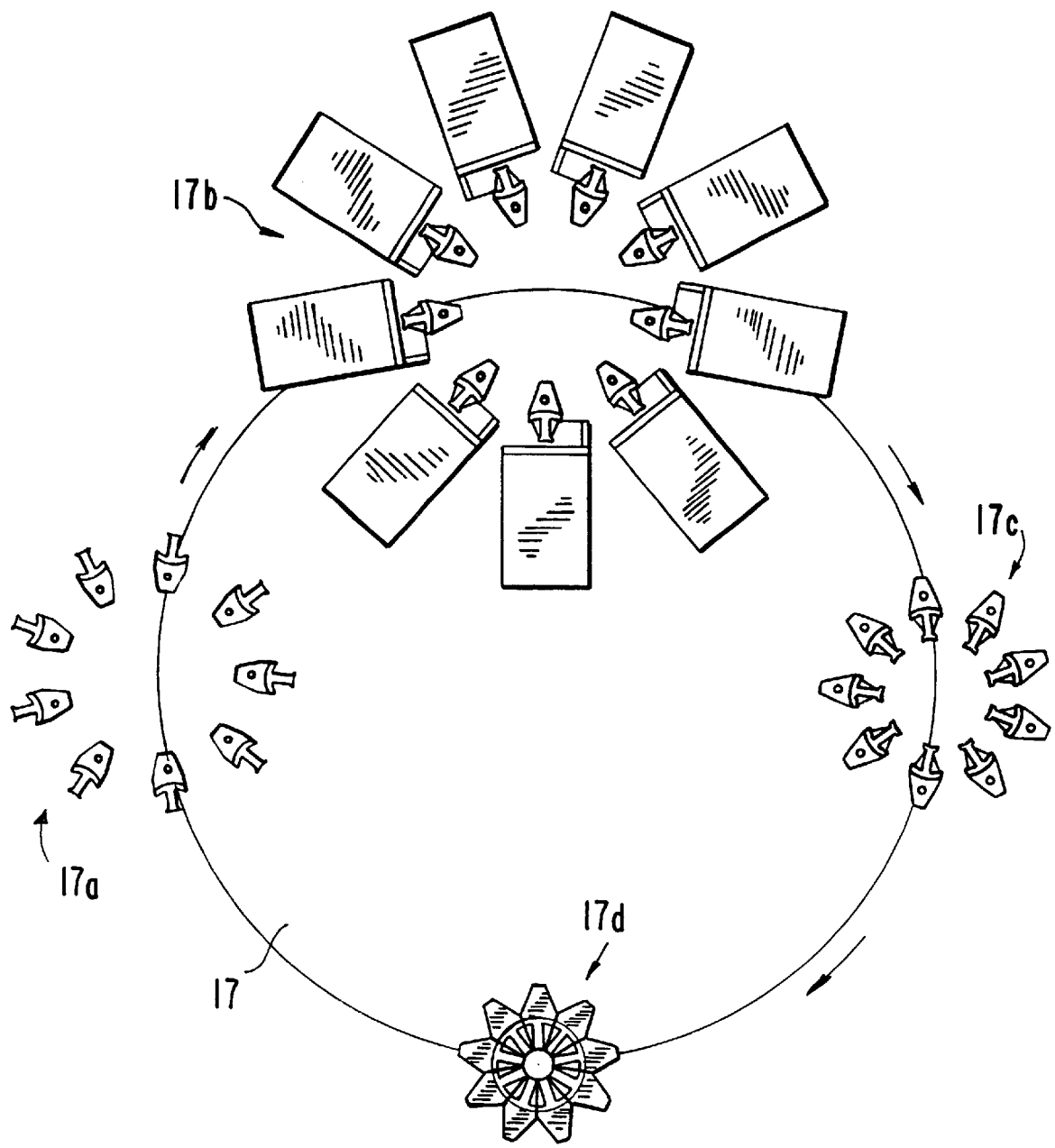
FIG. 10 is a layout view of an illustrative dynamo-electric machine component fabrication apparatus in accordance with the present invention.

FIG. 10 is a layout view of a machine, configured to apply the principles described above in a manufacturing environment. The machine has a rotating round table 17 with four working positions on it, each equipped with pliers like pliers 31, capable of accomplishing the movements described in the foregoing. The positions of the table can be presented to four different stations located around the table. At station 17a, the portions become gripped by pliers 31. A vibrator bowl dispenser of portions 20 (not shown) can be present in station 17a to supply the portions to the pliers. The portions being held by the pliers can be transferred from station 17a to station 17b by rotating the table. At position 17b, the portions can be wound by respective flyer arms, and terminated, as described in the foregoing. After a further rotation of the table, at station 17c, the pliers can be turned towards center 0, as has been described with reference to FIG. 5. At station 17d the pliers can be moved towards center 0 as described with reference to FIGS. 6 7 in order to form the core.: Once the core has been formed, it can be transferred from position 17d to a pallet of a conveyor, for travel to downstream stations where further processing steps can take place. In the case of processing with holster 90, the holster with the portions inserted can arrive on a transport pallet at a machine like the one shown in FIG. 10. The pallet stops near 17d. Here the holster can be removed from the pallet and placed on the pliers of the table. In station 17a, the arms of the holster can be sheared so that winding can occur in station 17b. In station 17c, the pliers can be turned towards center 0. Once the core is finished in station 17d, it can be transferred to a pallet, which brings a holster to the machine. After a rotation of the table, each of the positions of the table will be operating on respective portions in the stations which have been described. By operating in this manner, various cores can be in the act of being formed, simultaneously. Simultaneous formation of various cores will increase the throughput of the invention in the manufacturing environment.

Figure 11:
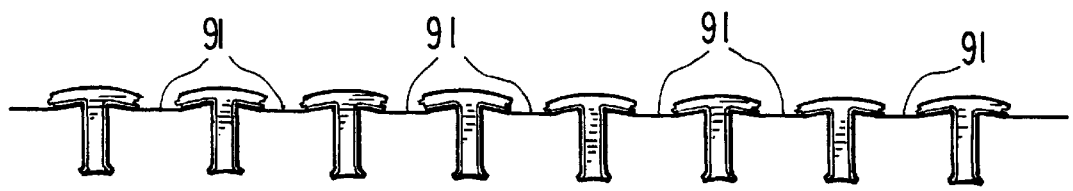
FIG. 11 shows an illustrative insulating holster arrangement that uses a linear holster in accordance with the present invention.
Figure 12:
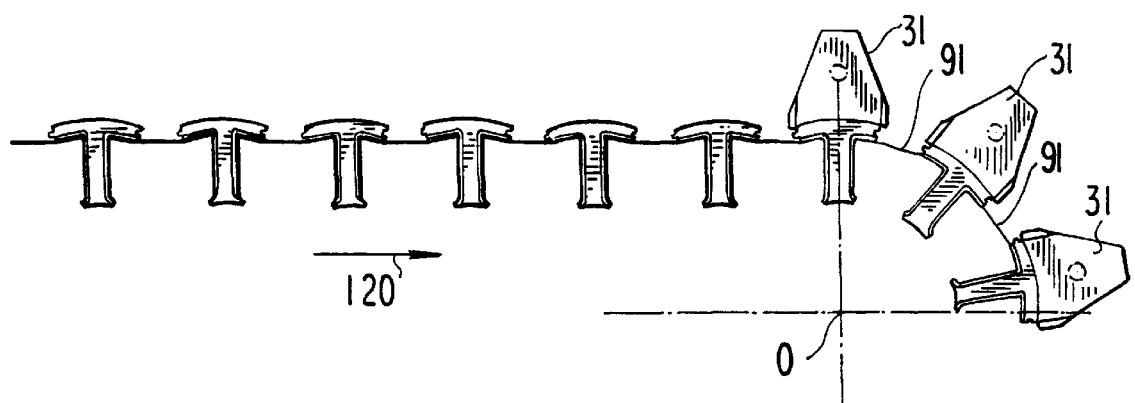
FIG. 12 shows an how the linear holster of FIG. 11 may be formed into a circle in accordance with the present invention.

FIG. 11 shows an alternative embodiment where the holster has a linear shape. As shown in FIG. 12, such a linear holster can be moved in direction 120 to feed the portions to pliers 31 placed on an imaginary circle having center 0. For sake of clarity, only three pliers are shown in FIG. 12, however there is preferably a set of pliers for each of the portions needed to form a core. Once the portions have been gripped by the pliers on the imaginary circle, arms 91 can be cut to allow the pliers to turn, as shown in FIG. 5, so that the central necks are directed outwardly for winding, as shown in FIG. 3. If more angular spacing is required for the flyer arm rotations to wind the coils, the pliers may be moved farther from center 0. After winding, the pliers can be turned again so that the central necks are directed inwardly towards center 0. Finally, the pliers can be moved towards center 0 to form the core, as shown in FIGS. 6 and 7.

Although the outer perimeters of the cores shown herein are circular, other outer perimeter shapes (such as nonagonal) are also possible. The outer surfaces of lamination portions 20 may be shaped to produce the desired finished core outer perimeter shape.

Additional aspects of the invention are described in connection with FIGS. 13–15. FIG. 13 shows a prospective partial view of plier 31.

Figure 15:
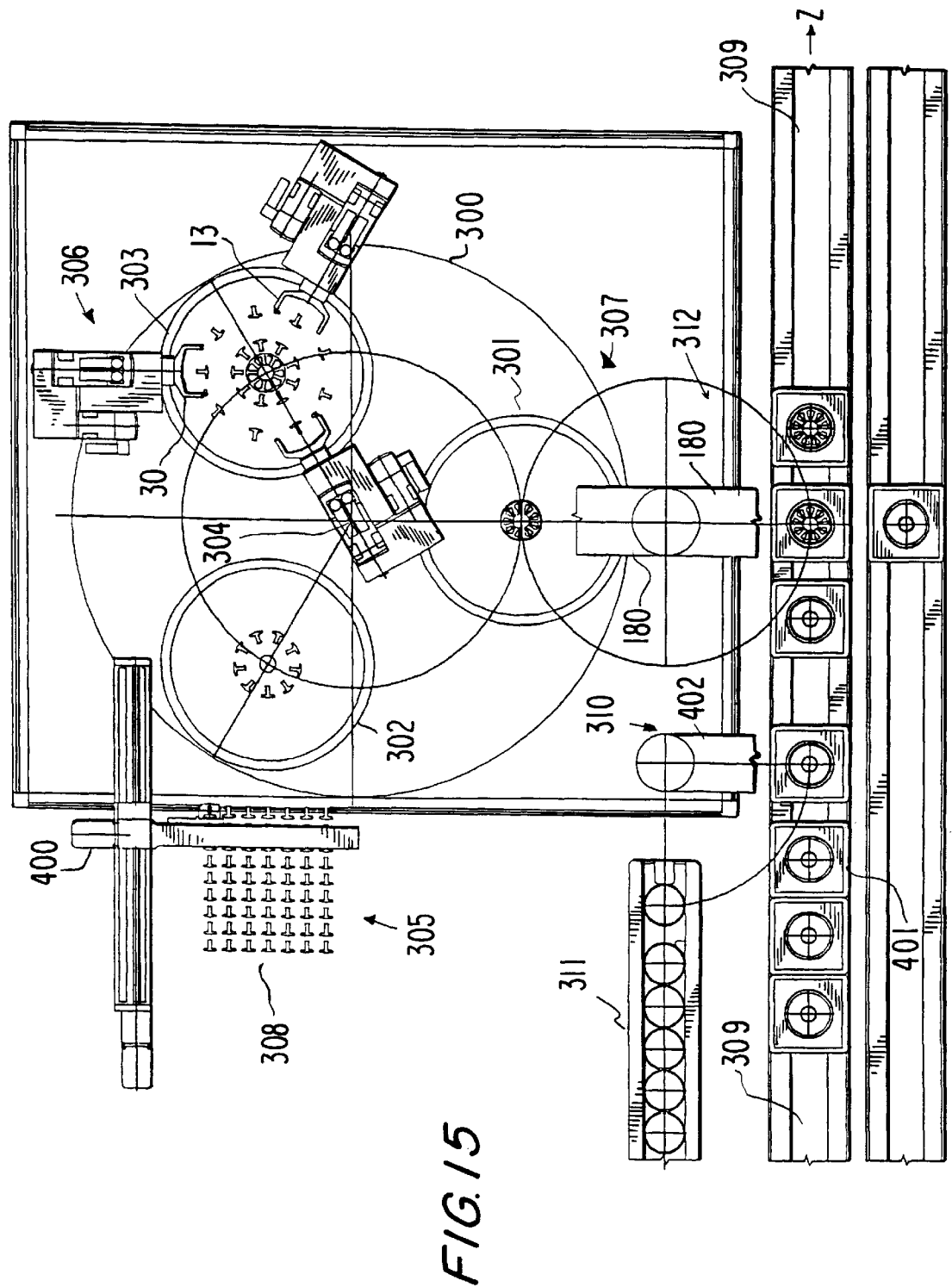
FIG. 15 is a layout view from direction 15 of FIG. 13 of a system for forming multiple pole stators in accordance with the present invention.

In the example illustrated in FIGS. 13–15, portion 20\* does not have protuberances and recesses such as the protuberances 21a and recesses 21b that were used for joining portions 20 of FIG. 1 together to form a multiple pole stator.

In FIG. 13, one portion 20\* has been shown aligned with a respective a holding member or plier 31 that needs to secure that portion 20\* onto itself, in order to accomplish the process steps described above.

When using portions like 20\* to form multiple pole structures, the final condition shown in FIG. 7 will correspond to abutting sides S and S between adjacent portions 20\* of the circle configuration shown. To be able to do so, sides S are slanted along radiuses which converge to the center of the circle configuration of FIG. 7.

In order to accomplish the process steps described in the cited provisional application using portions like 20\*, portions 20\* need to be secured and correctly positioned on plier 31. Thus, plier 31 is provided with shelf 130 for abutment of inferior face 140 of portion 20\* with upper surface 130' of shelf 130. Inferior face 140 is a face of the external circular part of 20\*, which is free from wire of coil 23. Surface 130' of shelf 130, and inferior face 140 should perfectly mate and therefore should be of the same size and configuration.

Cylindrical back surface 141 of portion 20\* can be contained by upright wall 131 of plier 31, in order to keep inferior face 140 precisely positioned on upper surface 130'. Upright wall 131 and back surface 141 measure the same amount in vertical direction X. Back surface 141 and upright wall 131 have a similar cylindrical configuration so that they can extensively abut against each other. Catch 150 is present on the top of plier 31 to push on top surface 142 of portion 20\*. More particularly, this occurs by pressing underside surface 151 of catch 150 against top surface 142.

Catch 150 is hinged around pin 160 of plier 31 so that catch 150 can rotate perpendicular to pin 160 (see rotation directions 160' and 160"). By swinging the catch in direction 160", underside surface 151 will press against top surface 142. Rotation in opposite direction 1601 completely clears the way for portion 20\* to come away from being in abutment with upper surface 130' of shelf 130. Portion 20\* can be moved in upwards direction X to come away from abutment with upper surface 130'. Catch 150 is provided with horizontal extension 152 biased by preloaded spring 153. Preloaded spring 153 is seated within plier 31, and presses on the underside of horizontal extension 152. This action of the spring will maintain catch 150 pressed on top surface 142 of portion 20\* when requiring to assure abutment between surfaces 130' and 140. Horizontal extension 152 protrudes underneath access passage 170, which is directed parallel to downwards direction X'. Access passage 170 is open on the top of plier 31 to receive pin 181 of gripper ring 180. Thus, pin 181 can accomplish relative motion in direction X' (with respect to plier 31), within access passage 170, to press and move horizontal extension 152 in opposition to preloaded spring 153. This will swing catch 150 in direction 160' when needing to clear the way for portion 20\*. Removal of pin 181 from the access passage will cause catch 150 to swing back in direction 160".

Portion 20\* can be further secured on shelf 130 by using gripper walls like 190. Gripper walls 190 are adjacent to respective sides 31A and 31B of plier 31 to move in radial directions Y and Y' (see FIG. 14 which is a partial view from directions 14—14 of FIG. 13). Tips 190' of the gripper walls are able to push on sides S of portions 20\* in order to laterally contain portions 20\* when surfaces 130' and 140 are in abutment. For sake of clarity only gripper wall 190 adjacent to face 31B is shown in FIG. 13.

As shown in FIG. 14, gripper wall 190 may be moved in radial direction Y' to reach the extended position shown by the phantom representation of tip 190'. In this condition the tip abuts and presses on a nearby side S of portion 20\*. Radial directions Y and Y' tend to be aligned with the center of the circle where portions 20\* need to be moved by pliers 31 in order to form the completed assembly of the stator. By using catch 150, upright wall 131, and gripper walls 190 in the manner that has been described in the foregoing, portion 20\* can be precisely releasably secured on shelf 130 of plier 31. At the same time, central neck 21" of portion 20\* will be allowed to protrude from shelf 130 in order to receive coil turns from a rotating flyer arm, as has been described above. In addition, when portion 20\* is secured to plier 31, plier 31 will be able to accomplish the rotation and radial movements described above to bring the multiple portions 20\* together as shown in FIG. 7.

Just prior to completing the radial movements to reach the condition shown in FIG. 7, gripper walls 190 need to be moved in outward radial directions like Y to render sides S of the various portions like 20\* free to abut against each other. Once the abutment condition of side S has been reached, the multiple poles may be encircled by a binding ring like binding ring 200 in order to durably secure the abutment condition. For sake of clarity, only a portion of such a binding ring has been shown in FIG. 13. The inner surface 201 of the binding ring will need to precisely encircle back surfaces 141 of portions 20\*, and press on them so as to maintain the abutment condition. This requires pushing portions 20\* into binding ring 200 with a press fit, while portions 20\* are in the abutment condition. This involves extracting portions 20\* from their respective pliers by movement in direction X, and inserting them into binding ring 200 while they are in the abutment condition. To do this, binding ring 200 can be positioned in alignment with portions 20\* and overhead as shown in FIG. 13. More particularly, binding ring 200 needs to be positioned so that it can concentrically receive portions 20\* by simultaneously pushing the portions 20\* in direction X, while portions 20\* are in the abutment condition.

As shown in FIG. 13, gripper ring 180 can be provided to hold and back up binding ring 200 in the overhead and aligned condition, while pliers 31 are holding portions like 20\* in the abutment condition. Shelves 130 of the pliers are provided with channels like 132 for passage of portions like 211 of pushers like 210 which can move in direction X. Portions like 211 can come in contact with faces 140 of portions 20\* in central position 140', when pushers like 210 are moved in direction X. By continuing such a movement of pushers like 210, and after catches like 150 have swung in direction 160', portions 20\* can be moved into ring 200 and there become press fitted in the abutment condition. Portion 212 and centering wall 213 of pusher like 210 are provided to abut against portion of face 143 and portions of pole surface 144, respectively, when portion 211 pushes against face 140. This will maintain portions 20\* stable and well aligned with the binding ring when the movement to press fit occurs. Portion 211, portion 212 and cantering wall 213 are multiple pusher portions that may act on respective portions 20\*, and can belong to a singular circular member which is moved in direction X to obtain the press fit. The binding ring and the portions 20\* press fitted within it form a single assembly that can be used as the final multiple pole stator.

To swing catch 150 in direction 160' when portions 20\* need to be move into binding ring 200, pin 181 needs to press on horizontal extension 152. This can be achieved by mounting pin 181 on gripper ring 180. There will be multiple pins such as pin 181, each of which may be aligned with access passages of respective pliers. In preparation for the movement required to press fit portions 20\*, gripper ring 180 can be moved in direction X' to come close to the pliers and to cause pins 181 to swing catches 150 out of the way.

FIG. 15 is a layout view from direction 15 of FIG. 13 of a system for forming multiple pole stators using portions like 20\* and binding ring 200. Three positions 301, 302, and 303 of round table 300 have pliers 31 able to move according to the principles illustrated above to present portions 20\* to the winding arms, to rotate to have the portions directed to the center of the final circular configuration of the multiple pole assembly, and to move the portions towards such a center in order to reach the abutment condition. The round table rotates around center 304 to transfer positions 301, 302, and 303 successively to working stations 305, 306, and 307. In working station 305, unwound portions 20\* are mounted on pliers 31 by a pick and place device 400 that collects portions 20\* in a store 308. In working station 306, portions 20\* are presented to the flyer arms 13 for winding, as shown in FIG. 2. Immediately after winding, the pliers in working station 306 are rotated and brought to converge to the abutment position as described above.

In working station 307, gripper 180 aligns binding ring 200 (FIG. 13) with portions 20\* that are in the abutment condition, and a pusher like 210 is used to press fit portions 20\* in the binding ring. The round table is reached by pallets 401 traveling in direction Z on conveyor 309. Just before reaching the round table, at 310 the pallets are loaded by pick and place device 402 with binding rings 200 taken from store 311. At 312, one pallet at a time is aligned with gripper 180 which can take a binding ring like 200 from a pallet and use it in working station 307 to achieve the press fit. There are two grippers like 180 at 312. One gripper takes the binding ring from the pallet and accomplishes the press fit, while at the same time, the other gripper simultaneously delivers a finished multiple pole stator to the emptied pallet. The finished multiple pole stator has been formed in 307 with a binding ring that reached 312 on the previous pallet which reached 312. The two grippers like 180 work alternatively according to these principles in order to more rapidly press fit and send away pallets with the finished multiple pole stator. Basically the work of press fitting by one gripper like 180 is time shaded by the work of the other gripper like 180. The grippers like 180 may alternate their role in performing the two operations.

Another aspect of the invention involves improved solutions for winding parts for dynamo-electric components. For example, arrangements for winding the pole pieces of dynamo electric components like stators and armatures may be provided. The pole pieces may be like those described above or any other suitable structures.

Another aspect of the invention involves arrangements for winding pole pieces of dynamo-electric components such as stators and armatures. The pole pieces may be like those described above.

Figure 16:
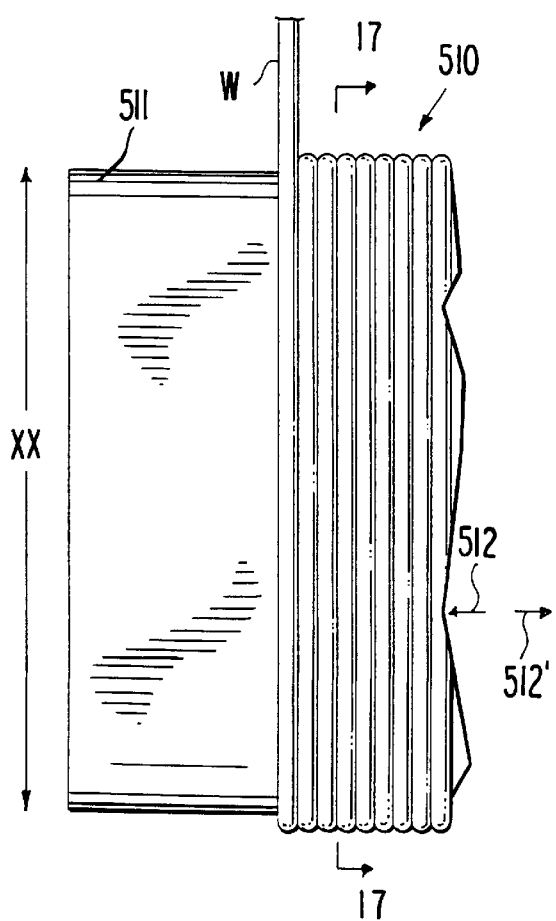
FIG. 16 is a cross-sectional view of a piece being wound in accordance with the present invention.

FIG. 16 shows an example of such pole pieces wound with a portion of coil 510 that is made up of a predetermined number of turns of wire W. The turns are wound around body 511, which has a major dimension XX and minor transverse dimension YY (see FIG. 17 which is a section view from direction 17—17 of FIG. 16, although showing the coil in an earlier stage of turn winding).

Figure 17:
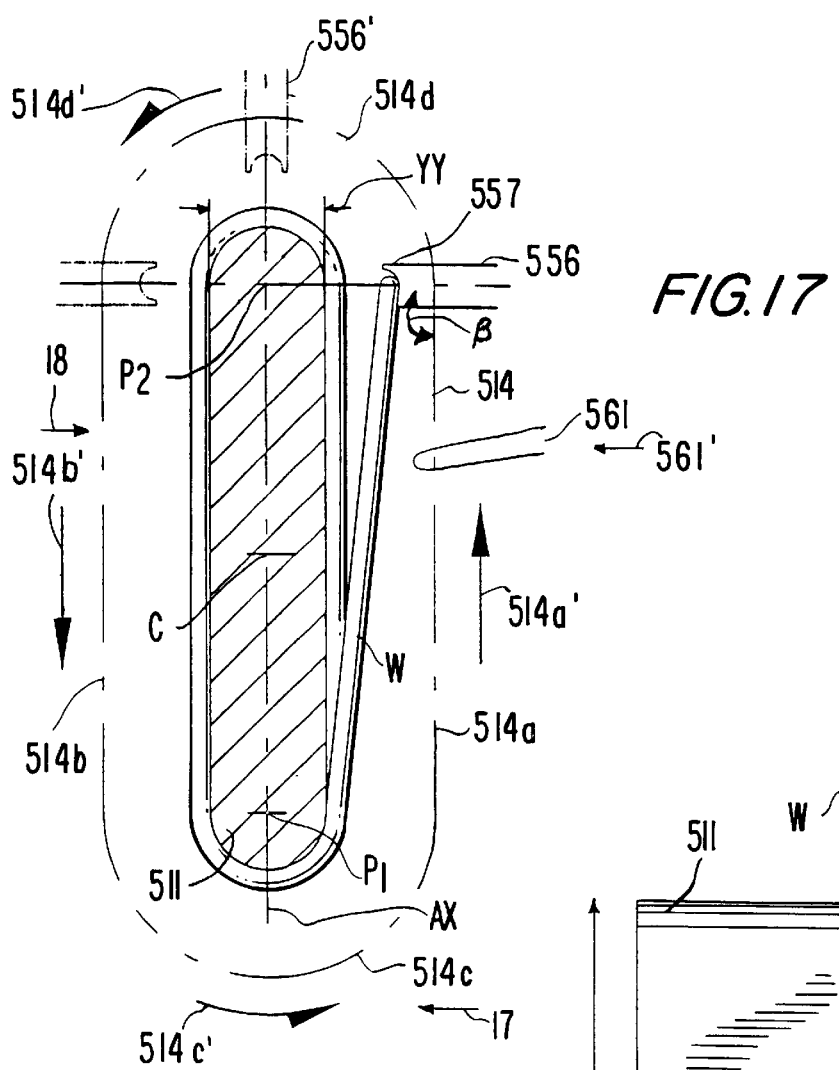
FIG. 17 is a side view of the piece taken from direction 17 in FIG. 16.

The apparatus of FIGS. 16 and 17 may wind wire by moving dispensing structure or nozzle 556 (wire nozzle in the following) in a non-circular and somewhat elliptical path around body 511 when dispensing wire W to form the turns. As shown in FIG. 16, the turns should be uniformly distributed in direction 512 and 512' along body 511, i.e., perpendicular to major dimension XX. Furthermore, as shown in FIG. 17 the turns should be wound against body 511 (in other words pulled against body 511 with a certain tension). A trajectory for the wire dispensing nozzle that can produce such coils is one that follows the path shown by line 514 of FIG. 17. Line 514 represents the various positions occupied by a point of the wire nozzle from which wire W exits to reach body 511. Trajectory 514 includes two rectilinear stretches 514a and 514b obtained by translations of the wire nozzle on either side of the body and parallel to the major dimension XX. The directions of translations 514a and 514b are opposite to each other (i.e., direction 514a' can be used for translation 514a and direction 514b' can be used for translation 514b). The translation stretches are connected by circular stretches 514c and 514d, obtained by rotation of the wire nozzle respectively around points P1 and P2 that are proximate to the ends of body 511, along the direction of major dimension XX. Points P1 and P2 can be centered on symmetry axis AX of body 511, which is parallel to major dimension XX, as shown, or offset laterally to axis AX by a predetermined amount. Points P1 and P2 can be located equidistant from center point C of body 511, or may be located at different distances from center point C. Arrows 514c' and 514d' represent the rotation directions that would be used to make the wire nozzle travel respectively on circular stretches 514c and 514d. By traveling on stretches 514a, 514d, 514b and 514c (in that order), the wire nozzle travels completely around body 511 to form a turn of the coil.

In FIG. 17, circular stretches 514c and 514d are shown as being contained in the same plane as stretches 514a and 514b, although any of these stretches can be entering or leaving such a plane in direction 512 or 512' to progressively form more turns. To complete the coil shown in FIGS. 16 and 17, the wire nozzle travels around body 511 as many times as needed for the number of turns that are required in the coil being wound. Further, nozzle should be moved in directions 512 or 512' to distribute the turns along body 511, as shown an FIG. 16. Such a distribution can be obtained by causing the nozzle to travel stretches 514a, 514b, 514c and 514d repeatedly in further planes parallel to the initial one where the first turn was formed. The turns will progress like a helical along body 511 in direction 512 or 512'.

Figure 18:
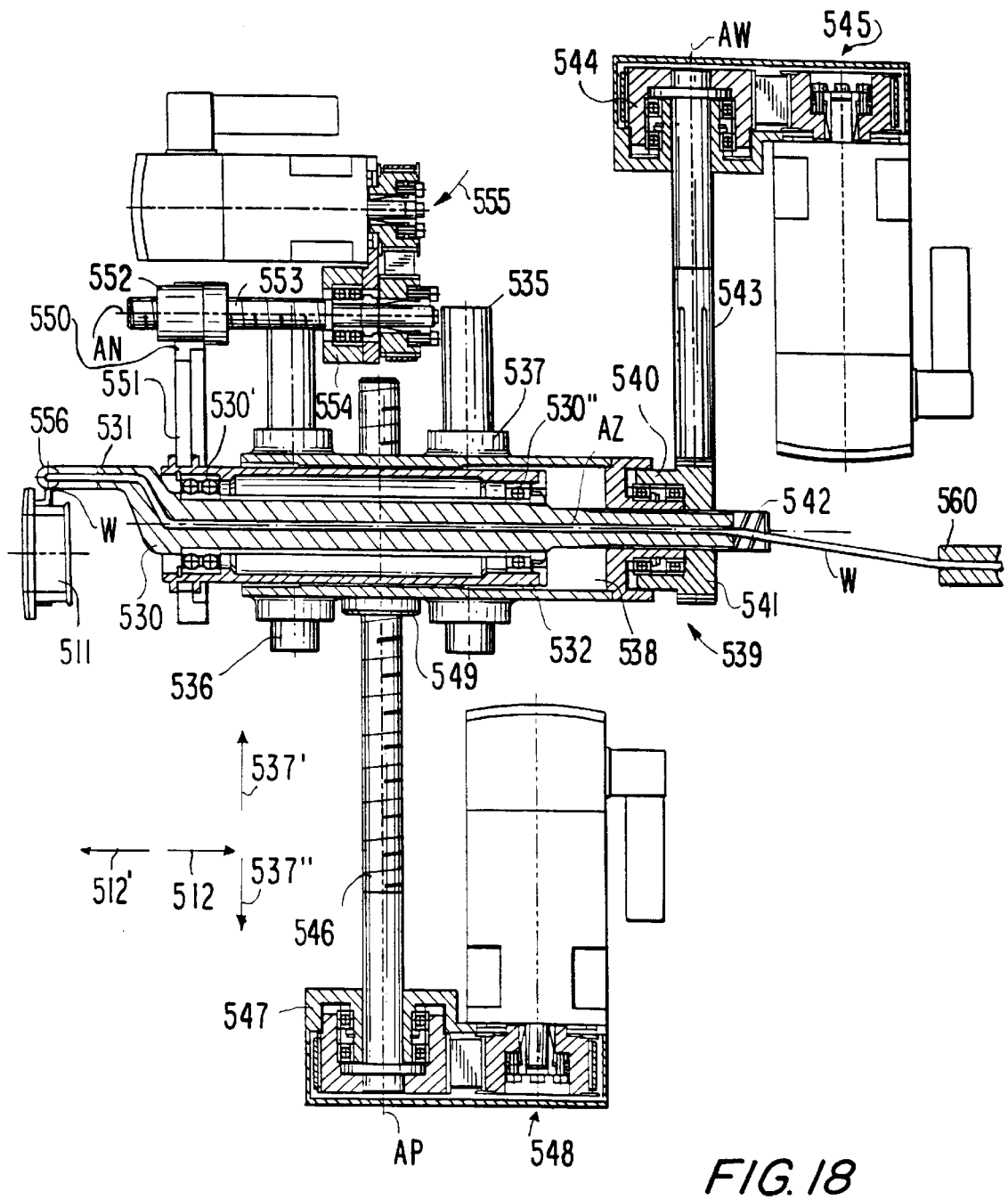
FIG. 18 is a top view of an illustrative wire winding apparatus for winding dynamo-electric pieces such as the piece of FIGS. 16 and 17 in accordance with the present invention.

FIG. 18 is a schematic representation of an illustrative apparatus that may be used to wind wire as shown in FIGS. 16 and 17. FIG. 18 is a view from direction 18 of FIG. 17 showing the winding nozzle 556 as it is rotated along winding stretch 514d (FIG. 17). Winding nozzle 556 is joined to cylindrical and hollow shaft 530 by means of lateral arm 531, which is also hollow. Shaft 530 is supported on bearings 530' and 530" so that shaft 530 may rotate around axis AZ of tube 532. Bearings 530' and 530" are seated in tube 532. Tube 532 is part of carriage 537. Carriage 537 can move in directions 537' and 537". Carriage 537 may be mounted on stationary guides 535 and 536, which are parallel to each other. Directions 537' and 537" are parallel to the axis AX shown in FIG. 17. Tube 532 can also slide in bore 538 of carriage 537. This sliding movement can occur in the directions 512 and 512' shown in FIG. 16. Rear portion 539 of bore 538 seats a bearing support 540 of gear wheel 541. The center of gear wheel 541 is hollow, although with portions configured for receiving key portions positioned around the rear end of hollow shaft 530. In this way rotation of gear wheel 541 will rotate hollow shaft 530 to move nozzle 556 along circular stretches 514a and 514b. At the same time hollow shaft 530 will be able to translate in directions 512 and 512' using gear wheel 541 (when required) in order to distribute the turns as shown in FIG. 16. The key portions around the rear end of hollow shaft 530 need to extend sufficiently along hollow shaft 530 to remain engaged with gear wheel 541 when hollow shaft 30 is translated in directions 512 and 512'. The external teeth of gear wheel 541 engage with those of a gear wheel 542 placed perpendicular to gear wheel 542. Even gear wheel 542 is hollow in its central portion with ways to receive key portions of shaft 543. Shaft 543 is mounted in bearing support 544, fixed to the frame of the machine, for rotation around axis AW. This rotation will rotate gear wheel 542. Motor belt drive 545 anchored to the frame of the machine drives the rotations of shaft 543 around axis AW. Axis AW is parallel to directions 537' and 537". Gear wheel 542 is also mounted on carriage 537 by means of a bearing support not shown. Thus, even if gear wheel 542 moves in directions 537' or 537" with carriage 537, transmission of rotation between shaft 543 and gear wheel 542 is possible due to the engagement of the key portions of shaft 543 within the central portion of gear wheel 542. Again, the lengths of the key portions on shaft 543 need to be sufficient to allow the required movements of gear wheel 542 in directions 537' and 537". The resulting rotation of gear wheel 541 will rotate hollow shaft 530 around points P1 and P2 to produce circular stretches 514e and 514d described with reference to FIG. 17. Shaft 546 is mounted in bearing support 547 fixed to the frame of the machine for rotation around axis AP. Motor belt drive 548, which is anchored to the frame of the machine, drives the rotations of shaft 546 around axis AP. Axis AP is parallel to the directions 537' and 537" that are used for movement of carriage 537. Shaft 546 is provided with an external thread for engaging a female thread present in portion 549 of carriage 537. When shaft 546 is rotated around axis AP, carriage 537 is moved in directions 537 or 537' (depending on the direction of rotation of shaft 546), due to the engagement of the threads mentioned. Movement in directions 537 or 537' causes movement of the winding nozzle along stretches 514a and 514b, described with reference to FIG. 17. The amount of travel of carriage 537 in directions 537' and 537" (which are also parallel to axis AX as described with reference to FIG. 17) will determine the position of points P1 and P2. The entire apparatus shown in FIG. 18 can be shifted on the frame of the machine to align or laterally offset travel directions 537' and 537" with respect to axis AX. In other words, axis AZ can be caused to intersect axis AX perpendicularly (e.g., axis AZ may be oriented into the page of FIG. 17 through center point C or elsewhere along axis AX) or may be caused to be offset laterally with respect to axis AX.

The front portion of tube 532 is received in slot 551 of side plate 550. Side plate 550 is flanged to sleeve 552, which has a female thread engaged on male thread of shaft 553. Shaft 553 is supported to rotate around axis AN, by being supported in bearing support 554 of the frame of the machine. Motor belt drive 555 is also anchored to the frame of the machine and is used to rotate shaft 553 around axis AN. Rotation of shaft 553 around axis AN causes tube 532 to move in directions 512 and 512', depending on the direction of rotation of motor belt drive 555.

Slot 551 allows tube 532 to be moved in directions 537' and 537" as a result of movement of carriage 537, whilst tube 532 is also able to move in directions 512 and 512'. Movements in directions 512 and 512' are required to cause the winding nozzle to distribute the turns along body 511 as described with reference to FIG. 16.

In FIGS. 17 and 18, the winding nozzle has been represented as a pulley wheel 556 having a groove 557, through which the wire being dispensed can run to reach body 511. FIG. 18 shows that the pulley wheel is fixed to the end of lateral arm 531. The wire required to wind the coil runs through hollow shaft 530 and lateral arm 531 to reach pulley wheel 556. This wire comes from a supply drum (not shown) and is directed to the rear end of hollow shaft 530 by directing nozzle 560. A wire tensioner should be used to apply tension to the wire being dispensed by the winding nozzle. The tensioner should act on the wire as it runs between the supply drum and directing nozzle 560.

The position of the pulley wheel shown in FIG. 18 with respect to body 511 corresponds to the phantom line representation of the pulley wheel in position 556' of FIG. 17.

The combination of translational and circular wire winding trajectories shown in FIG. 17 maintain the groove of the pulley wheel with a practically constant orientation beta (about 90° in FIG. 17) in relation to the surface of body 511 where the wire needs to be wound. This orientation is preset by fixing the pulley wheel with a predetermined angle on lateral arm 531. The angle should be such that groove 557 (in other words the exit of the wire) gives a slight bend to the wire exiting, and favors laying the wire against body 511. Further, the length of wire going from the exit of the wire to where it is being laid on body 511, in a particular instant, should be as short as possible to avoid losing control of the wire tension. To do this the stretches of travel for the winding nozzle as have been described with reference to FIG. 18 make the winding nozzle travel very near to body 511, and all around its surfaces where the wire turns need to be wound. The motor belt drives of FIG. 18 can be programmable to change the distance separating the winding nozzle from body 511 in order to suit the particular size of body 511 and the type of wire being wound.

The combination of the wire exit being in a required orientation with respect to body 511 and the short length of wire exiting between body 511 and the wire nozzle greatly favor laying the wire tightly against body 511, and in required positions of body 511.

If desired, arrangements such as those described in connection with FIGS. 16–18 in which the wire nozzle follows a path according to stretches 514a, 514b, 514c and 514d, may be used for winding pole pieces such as portions 20 and 20* described in connection with FIGS. 1–15. Flyer rotation to wind such poles requires keeping the exit point of the flyer at a greater distance from body 511 because the related circular orbit has to be greater than major dimension XX. The apparatus of FIG. 18 can be used to wind the pole pieces of FIG. 18 when the pole pieces are supported by support structures for the poles that are able to rotate and close in radially according to the principles described in connection with FIGS. 1–15 to bring the pole pieces together.

Pusher member 561 of FIG. 17 may push wire W that extends between the wire nozzle and body 511. Pusher member 561 can be out of the way when winding nozzle 556 passes, and may then be caused to move inwardly in direction 561' push on the wire in order to favor winding the turns against body 511. Various members like 561 can be positioned around body 511 to press the wire when there may be difficulties in achieving winding of the wire against certain portions of body 511.

Figure 19:
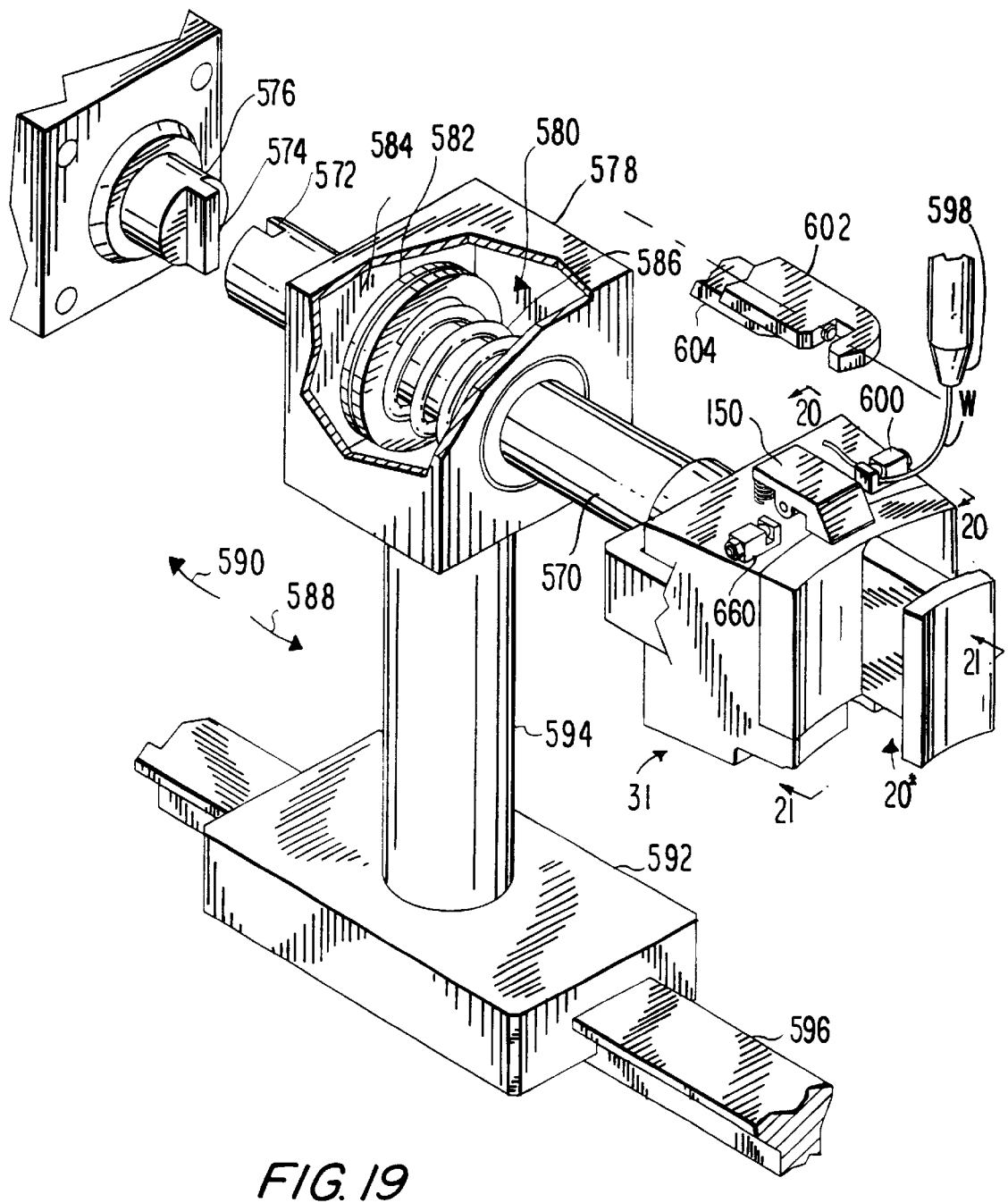
FIG. 19 is a perspective view of an illustrative winding machine arrangement similar to that of FIG. 13, which may be used to wind portions of dynamo-electric machine components in accordance with the present invention.

A winding machine arrangement that may be used to wind wire onto portions 20* is shown in FIG. 19. Portion 20* may be wound by rotating a support structure such as member 570 around its longitudinal axis. Member 570 may have a notch 572 that receives a corresponding protrusion 574 on rotating member 576 when member 570 is being rotated by rotating member 576. (Notch 572 and protrusion 574 are shown as being separated in FIG. 19 for clarity).

Member 570 may be supported by housing 578. Housing 578 may contain a spring brake 580. Member 570 is movable. When member 570 is moved in direction 590 by moving housing 578 in direction 590, protrusion 574 of rotating member 576 engages notch 572. Ring 582 is attached to member 570, so that further movement of housing 578 in direction 590 causes ring 582 to compress spring 586. This moves ring 582 away from rear wall 584 of housing 578, so that member 570 may rotate freely when turned by rotating member 576. When housing 578 is moved in direction 588, protrusion 574 of rotating member 576 and notch 572 disengage and ring 582 is pressed against rear wall 584 by spring 586, thereby creating a braking friction between ring 582 and rear wall 584. The braking friction holds member 570 and portion 20* in a static position, so that operations such as wire anchoring may be performed.

Housing 578, base 592, support 594, and member 570 may be translated in directions 590 and 588 by moving base 592 along rail 596. A linear actuator in base 592 or separate from base 592 may be used to move base 592. Linear translation in direction 588 may be used to assemble portions like 20* into a complete dynamo-electric machine component after winding of the portions is finished. This assembly step may involve a press-fit or binding ring approach or any other suitable approach for joining portions into complete components. Multiple arrangements of the type shown in FIG. 19 may be arranged in a circle and the portions joined together by these arrangements at the center of the circle.

During winding, wire W may be dispensed from nozzle 598 after attaching wire W to temporary anchoring device 600. Nozzle 598 may be translated during winding in directions 590 and 588 to distribute wire W evenly on portion 20*. If desired, portions 20* may be translated and nozzle 598 held stationary or both nozzle 598 and portions 20* may translated relative to one another, rather than moving nozzle 598.

One end of wire W may be retained in one of temporary anchoring devices 600 at the beginning of the winding operation. After winding is complete, the other end of wire W may be retained in the other anchoring device 600. A spring may be used in anchoring devices 600 to retain wire W. Hook 602 may be used to place wire W in anchoring devices 600. Knife 604 may be slid along hook 602 when it is desired to sever wire W during anchoring operations. After portions 20* have been formed into a dynamo-electric machine component, the wire ends anchored in anchoring devices 600 may be transferred to termination posts or the like that are located on the component.

In the illustrative example of FIG. 19, wire W is wound onto portion 20* by rotating portion 20* while nozzle 598 is held stationary. An advantage of this approach is that it may cause wire W to balloon less during winding than a rotating flyer approach, which may result in better control of the wire deposition process and therefore a higher-quality wire coil. However, the rotating workpiece approach of FIG. 19 is merely illustrative. If desired, portions like 20* may be wound by rotating and translating the nozzle 598, by rotating nozzle 598 and translating portion 20*, or by using any suitable combination of such motions.

If desired, portion 20* may be gripped by grippers on the sides of plier 31 (as with grippers 190 of FIG. 13). Illustrative grippers 606 that may be used with the arrangement of FIG. 19 are shown in FIGS. 20 and 21.

Figure 20:
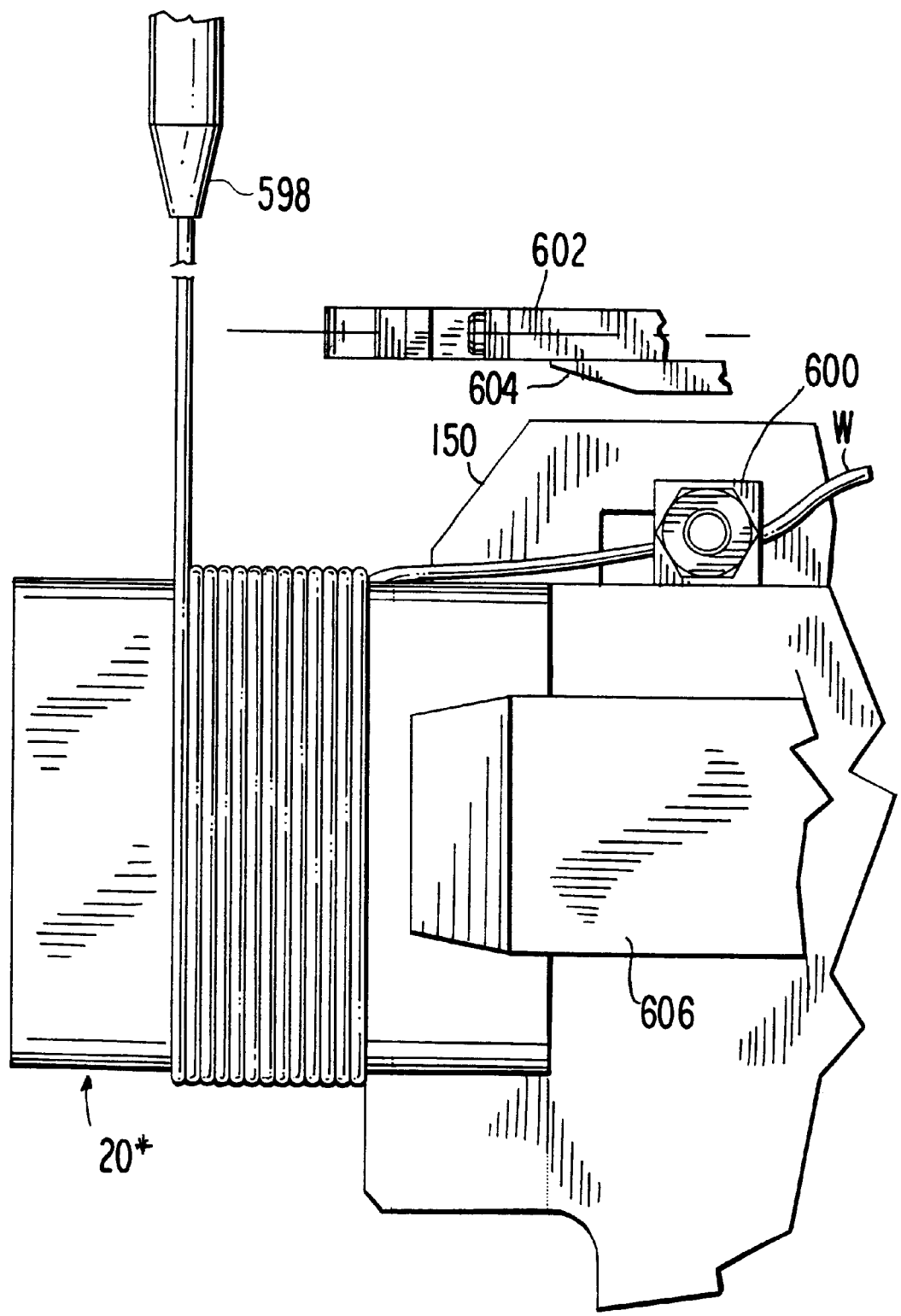
FIG. 20 is front view of the winding machine arrangement of FIG. 19 taken from the direction indicated in FIG. 19.
Figure 21:
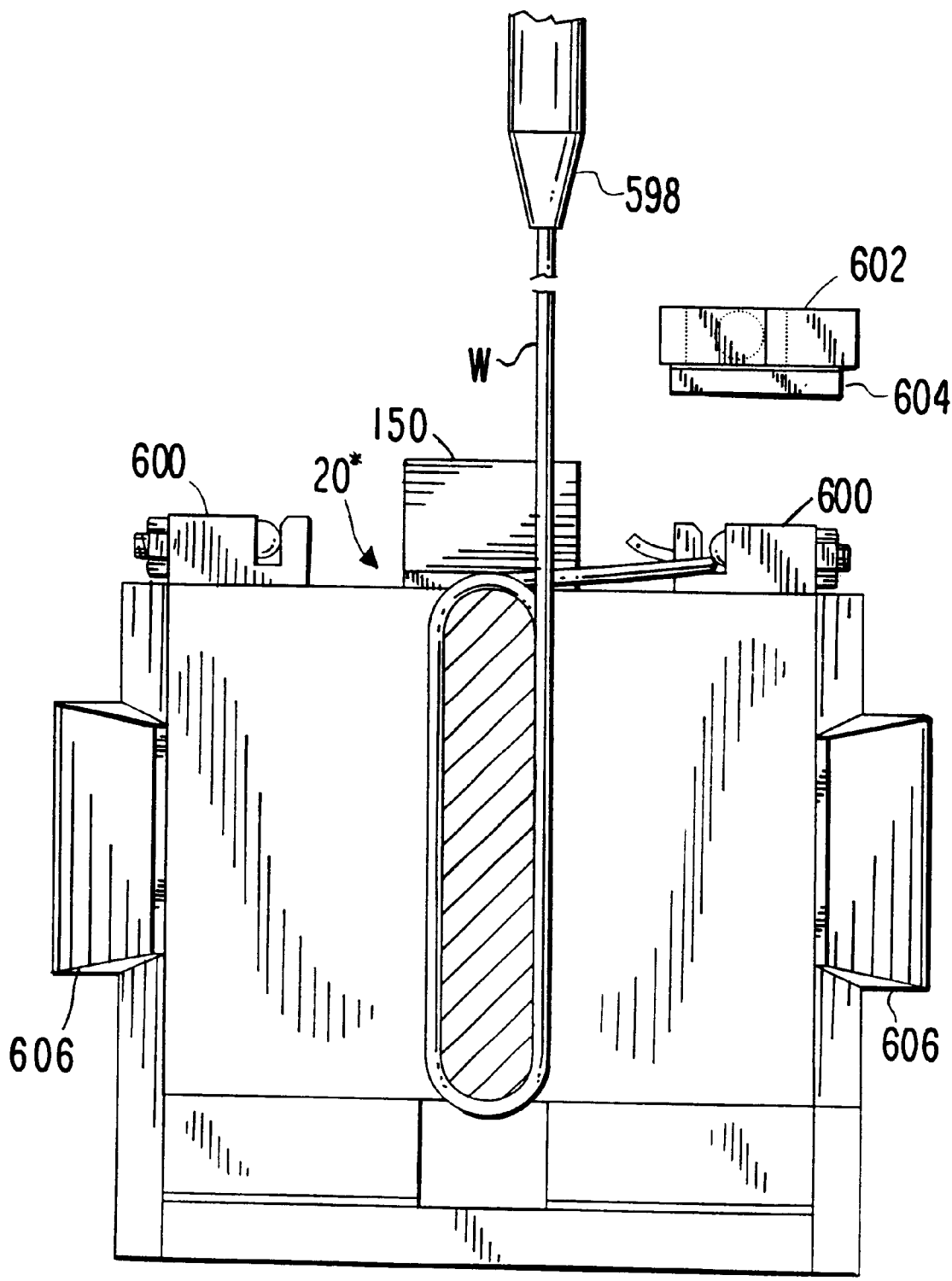
FIG. 21 is a side view of the winding machine arrangement of FIG. 19 taken in the direction indicated in FIG. 19.

In the example of FIGS. 19–21, portion 20* is a portion of a stator. This is merely illustrative. If desired, rotors or the like may be fabricated using arrangements such as shown in FIGS. 19–21.

Winding and component fabrication arrangements such as those of FIGS. 19–21 allow portions of dynamo-electric machine components to be formed into complete components using the same support members that are used to wind the portions of the components.

The foregoing is merely illustrative of the principles of this invention and various modifications can be made by those skilled, in the art without departing from the scope and spirit of the invention.

What is claimed is:

1. A method for forming components for dynamo-electric machines comprising:

winding wire on a plurality of separate portions of a dynamo-electric machine component to form wire coils on each separate portion;

using a plurality of holding members to arrange the plurality of portions in a circle;

rotating the holding members and portions inwardly towards the center of the circle after the wire coils have been wound; and joining the plurality of portions together after winding the wire coils to form the dynamo-electric machine component.

2. The method defined in claim 1 further comprising causing the holding members and portions to converge toward the center of the circle after the portions have been rotated inwardly to gather the portions together to form the dynamo-electric machine component.

3. The method defined in claim 1 further comprising causing the holding members and portions to converge toward the center of the circle to press fit the portions together to form the dynamo-electric machine component.

4. A method for forming components for dynamo-electric machines comprising:

placing a plurality of separate portions of a dynamo-electric machine component into an insulating holster before winding;

using a shearing operation to separate the portions in the holster from each other;

winding wire on the plurality of separate portions to form wire coils on each separate portion; and joining the plurality of separate portions together after winding the wire coils to form the dynamo-electric machine component.

5. A method for forming components for dynamo-electric machines comprising:

winding wire on a plurality of separate portions of a dynamo-electric machine component to form wire coils on each separate portion; and joining the separate dynamo-electric machine component portions together after winding the wire coils to form the dynamo-electric machine component; wherein a rotating table having multiple stations is used to assemble the portions into the dynamo-electric machine component, the method further comprising:

winding the wire coils at a first of the stations; and turning the portions towards each other at another of the stations.

6. A method for forming components for dynamo-electric machines comprising:

winding wire on a plurality of separate portions of a dynamo-electric machine component to form wire coils on each separate portion;

joining the separate dynamo-electric machine component portions together after winding the wire coils to form the dynamo-electric machine component;

holding the portions during winding using holding members that each have a shelf on which a respective one of the portions rests;

holding a binding ring relative to the joined dynamo-electric machine portions; and using a pusher to press-fit the joined dynamo-electric machine portions into the binding ring, wherein at least a portion of the pusher passes through a recess in each shelf.

7. A method for forming components for dynamo-electric machines comprising:

winding wire on a plurality of separate portions of a dynamo-electric machine component to form wire coils on each separate portion;

joining the separate dynamo-electric machine component portions together after winding the wire coils to form the dynamo-electric machine component;

using a rotating table having multiple stations to assemble the portions into the dynamo-electric machine component; and using a gripper to move the component between the rotating table and a conveyor.

8. A method for forming components for dynamo-electric machines comprising:

winding wire on a plurality of separate portions of a dynamo-electric machine component to form wire coils on each separate portion;

using a rotating shaft and a translating carriage to move a rotating flyer in a nearly elliptical path to wind the wire coils; and joining the separate dynamo-electric machine component portions together after winding the wire coils to form the dynamo-electric machine component.

9. A method for forming a component for a dynamo-electric machine from separate portions of such a component comprising:

winding wire coils onto each separate portion from a plurality of respective wire dispensing structures;

holding the separate portions using a plurality of respective holding members while the wire coils are wound; and using a plurality of movable support structures on which the holding members are mounted to join each of the portions together to form the component while each portion is being held by the same holding member that was used during winding of the wire coils onto that portion.

10. The method defined in claim 9 further comprising positioning the wire before and after each portion is wound using a plurality of hooks each of which is associated with a respective one of the holding members.

11. The method defined in claim 9 further comprising rotating each movable support member as wire is dispensed during winding.

12. The method defined in claim 9 further comprising using a linear translation stage to move the portions together when forming the component.

13. The method defined in claim 9 wherein the wire dispensing structures comprise nozzles, the method further comprising translating the nozzles during winding to evenly distribute the wire on the portions.

14. The method defined in claim 9 further comprising using anchoring structures on the holding members to anchor the wire.

15. The method defined in claim 9 further comprising arresting rotational motion of the moveable support structures using brakes.

16. The method defined in claim 9 wherein the holding members each have a shelf, the method further comprising resting the portions on the shelves during winding.

17. The method defined in claim 9 further comprising:

using the plurality of movable support structures to arrange the plurality of portions in a circle; and using the plurality of movable support structures to rotate the holding members and portions inwardly towards the center of the circle after the wire coils have been wound.

18. The method defined in claim 9 further comprising:

using the plurality of movable support structures to arrange the plurality of portions in a circle;

using the plurality of movable support structures to rotate the holding members and portions inwardly towards the center of the circle after the wire coils have been wound; and using the plurality of movable support structures to cause the holding members and portions to converge toward the center of the circle after the portions have been rotated inwardly to gather the portions together to form the dynamo-electric machine component.

19. The method defined in claim 9 further comprising:

using the plurality of movable support structures to arrange the plurality of portions in a circle;

using the plurality of movable support structures to rotate the holding members and portions inwardly towards the center of the circle after the wire coils have been wound; and using the plurality of movable support structures to cause the holding members and portions to converge toward the center of the circle to press fit the portions together to form the dynamo-electric machine component.

20. The method defined in claim 9 further comprising:

placing the separate portions into an insulating holster before the wire is wound; and using a shearing operation to separate the portions in the holster from each other.

21. The method defined in claim 9 wherein a rotating table having multiple stations is used to assemble the portions into the dynamo-electric machine component, the method further comprising:

winding the wire coils at a first of the stations; and turning the portions towards each other at another of the stations.

22. The method defined in claim 9 wherein the holding members each have a shelf on which a respective one of the portions rests, the method further comprising:

holding a binding ring relative to the joined dynamo-electric machine portions; and using a pusher to press-fit the joined dynamo-electric machine portions into the binding ring, wherein at least a portion of the pusher passes through a recess in each shelf.

23. The method defined in claim 9 further comprising:

using a rotating table having multiple stations to assemble the portions into the dynamo-electric machine component; and using a gripper to move the component between the rotating table and a conveyor.

24. The method defined in claim 9 further comprising using a plurality of rotating shafts and translating carriages to move the plurality of wire dispensing structures in nearly elliptical paths to wind the wire coils.

* * * * *